(12) United States Patent
Kim et al.

(10) Patent No.: US 11,301,522 B1
(45) Date of Patent: Apr. 12, 2022

(54) METHOD AND APPARATUS FOR COLLECTING INFORMATION REGARDING DARK WEB

(71) Applicant: KOREA INTERNET & SECURITY AGENCY, Naju-si (KR)

(72) Inventors: Kyeong Han Kim, Naju-si (KR); Moon Hee Cho, Naju-si (KR); Yong Hee Shin, Naju-si (KR)

(73) Assignee: KOREA INTERNET & SECURITY AGENCY, Naju-si (KR)

( * ) Notice: Subject to any disclaimer, the term of this patent is extended or adjusted under 35 U.S.C. 154(b) by 0 days.

(21) Appl. No.: 17/336,778

(22) Filed: Jun. 2, 2021

(30) Foreign Application Priority Data

Dec. 18, 2020 (KR) .................. 10-2020-0179012

(51) Int. Cl.
| | | |
|---|---|---|
| *G06F 16/951* | (2019.01) | |
| *G06F 16/955* | (2019.01) | |
| *G06F 16/35* | (2019.01) | |
| *G06F 16/31* | (2019.01) | |
| *G06F 16/957* | (2019.01) | |
| *G06N 3/08* | (2006.01) | |

(52) U.S. Cl.
CPC .......... *G06F 16/951* (2019.01); *G06F 16/313* (2019.01); *G06F 16/35* (2019.01); *G06F 16/9566* (2019.01); *G06F 16/9574* (2019.01); *G06N 3/08* (2013.01)

(58) Field of Classification Search
CPC .... G06F 16/951; G06F 16/35; G06F 16/9566; G06F 16/9574; G06F 16/313; G06N 3/08
See application file for complete search history.

(56) References Cited

U.S. PATENT DOCUMENTS

| | | | |
|---|---|---|---|
| 2009/0020461 A1 | 8/2009 | Hellstrom et al. | |
| 2009/0204610 A1* | 8/2009 | Hellstrom | ............... G06F 16/00 |
| 2018/0288073 A1* | 10/2018 | Hopper | ............. G06Q 20/4016 |
| 2018/0349517 A1* | 12/2018 | Kleiman-Weiner | .... G06F 16/36 |
| 2019/0007440 A1* | 1/2019 | Lavi | ........................ G06Q 50/26 |
| 2019/0347327 A1* | 11/2019 | Patil | ........................ G06N 3/084 |
| 2020/0151222 A1* | 5/2020 | Mannar | ................ G06K 9/4628 |
| 2020/0204574 A1* | 6/2020 | Christian | ............. G06K 9/6218 |
| 2020/0279041 A1* | 9/2020 | Endler | ................ G06F 21/6245 |

FOREIGN PATENT DOCUMENTS

| | | |
|---|---|---|
| CN | 109522017 A | 3/2019 |
| JP | 2007-129431 A | 5/2007 |
| JP | 2016-053956 A | 4/2016 |
| JP | 2017-501512 A | 1/2017 |
| KR | 10-2019-0054478 A | 5/2019 |
| KR | 10-2060766 B1 | 12/2019 |
| KR | 10-2147167 B1 | 8/2020 |

* cited by examiner

*Primary Examiner* — Dangelino N Gortayo
(74) *Attorney, Agent, or Firm* — Studebaker & Brackett PC (57) ABSTRACT

A method for collecting dark web information is provided. The method for collecting dark web information is performed by a computing device and comprises obtaining a list of onion addresses of a plurality of target dark web sites, accessing at least one of the plurality of target dark web sites, collecting web page information of the accessed dark web site, storing information on the accessed dark web site by analyzing the collected web page information and providing an analysis result of the accessed dark web site by using the stored information on the accessed dark web site.

18 Claims, 11 Drawing Sheets

METHOD AND APPARATUS FOR COLLECTING INFORMATION REGARDING DARK WEB

This application claims the benefit of Korean Patent Application No. 10-2020-0179012, filed on Dec. 18, 2020, in the Korean Intellectual Property Office, the disclosure of which is incorporated herein by reference in its entirety.

BACKGROUND

1. Field

The present disclosure relates to a method and apparatus for collecting dark web information. More specifically, the present disclosure relates to a method and apparatus capable of increasing the efficiency of information collection and minimizing system resource consumption in collecting web page information of a dark web with high anonymity.

2. Description of the Related Art

The dark web refers to the web portion of the dark net, which is an overlay network that can be accessed only with specific software or network permissions or settings that use non-standard communication protocols and ports. Dark web user's ID and location are kept anonymous, and difficult to track due to layered encryption system, and dark web encryption technology routes user's data through multiple intermediate servers to protect user's identity and ensure their anonymity. The information transmitted from the dark web can be decrypted only by the subsequent node of the scheme, which leads to the end node. Due to the complex system of the dark web, it is difficult to reproduce the node path and decode the information layer by layer. Further, due to the high level of encryption, it is difficult for a web host on the dark web to track the user's geographic location and IP, and on the contrary, it is difficult for the user to recognize information about the host.

As such, various cybercrimes such as the distribution of drugs, pornography, and the concealment of criminal funds using the dark web with high anonymity are increasing rapidly, and their level is also increasing. The number of domestic dark web users in 2019 averaged 15,000 per day, which has increased more than three times higher than in 2016, and the number of global users reached 2.9 million during the same period. In addition, as of 2017, cybercrime-related sites accounted for more than half of the total dark web.

As cybercrimes using the dark web are exploding and the level of crime is gradually increasing, an accurate analysis of the dark web is required to prevent such cybercrime. However, until now, the technology that can accurately and efficiently analyze information on the dark web is not developed.

The reason is that, due to the nature of the dark web network that guarantees anonymity, the stability of the network cannot be guaranteed, so information collection is not smooth. For example, in the case of collecting information on the dark web using a synchronous crawler, which is a general web crawler type, after assigning a task, if the task is not completed, it cannot proceed to the next task. And thus, there was a problem that getting into an infinite loop or securing all of the data is difficult when such synchronous crawler is used.

In order to solve the above problem, it is necessary to develop a technology that can efficiently collect web page information in a dark web where the network is not stable.

SUMMARY

The technical problem to be solved through some embodiments of the present disclosure is to provide a method and apparatus for collecting web page information of a dark web from a dark web.

Another technical problem to be solved through some embodiments of the present disclosure is to provide a method and apparatus for collecting data in units of individual pages existing on the dark web by applying an asynchronous method.

Another technical problem to be solved through some embodiments of the present disclosure is to provide a method and apparatus for improving data collection efficiency and minimizing system resource consumption without stopping the operation of data collection through scheduling of a crawling instance.

Another technical problem to be solved through some embodiments of the present disclosure is to provide a method and apparatus for constructing a test bed capable of detecting the operation and performance of the dark web using information collected from the dark web.

The technical problems of the present disclosure are not limited to the technical problems mentioned above, and other technical problems that are not mentioned will be clearly understood by those skilled in the art from the following description.

According to a method for collecting dark web information performed by a computing device comprising, obtaining a list of onion addresses of a plurality of target dark web sites, accessing at least one of the plurality of target dark web sites, collecting web page information of the accessed dark web site, storing information on the accessed dark web site by analyzing the collected web page information and providing an analysis result of the accessed dark web site by using the stored information on the accessed dark web site.

According to an embodiment, wherein collecting web page information of the accessed dark web site comprises asynchronously crawling on web pages belonging to a domain of the accessed dark web site.

According to an embodiment, wherein asynchronously crawling on web pages belonging to the domain of the accessed dark web site comprises re-executing the asynchronous crawling on the web pages after a predetermined time interval when the asynchronously crawling is completed.

According to an embodiment, wherein asynchronously crawling on web pages belonging to the domain of the accessed dark web site comprises checking an execution status of the asynchronous crawling at predetermined time intervals.

According to an embodiment, wherein accessing at least one of the plurality of target dark web sites comprises, identifying whether the accessed dark web site requires input of a captcha code and inputting the captcha code of the accessed dark web site using a captcha code bypass module.

According to an embodiment, wherein the captcha code bypass module includes a captcha code recognition model based on an artificial neural network.

According to an embodiment, wherein the captcha code recognition model is a model trained using a training data set, wherein the training data set includes a first group of captcha codes which are collected on a web and a second group of captcha codes which are randomly generated.

According to an embodiment, wherein the captcha code recognition model is a model based on a convolutional neural network and trained with each character of characters within a plurality of images of a training data set.

According to an embodiment, wherein storing information on the accessed dark web site by analyzing the collected web page information comprises, identifying other web page address and information on a parameter used when accessing the other web page address from a web document corresponding to the collected web page information, identifying an email address from the web document corresponding to the collected web page information and determining a type of the accessed dark web site based on words included in the web document corresponding to the collected web page information.

According to an embodiment, wherein determining a type of the accessed dark web site based on words included in the web document corresponding to the collected web page information comprises, converting the collected web page information into plain texts, generating a document-term matrix using the plain texts, calculating a frequency for each word based on the generated document-term matrix and classifying a type of the accessed dark web site by assigning an index to a word corresponding to a frequency equal to or greater than a preset frequency and analyzing whether the indexed words correspond to a preset word.

According to an embodiment, wherein identifying the other web page address and information on the parameter used when accessing the other web page address comprises, adding the other web page address to the list of onion addresses of the plurality of target dark web sites, based on a determination that a web page corresponding to the collected web page information and the other web page belong to different domains.

According to an embodiment, wherein storing information on the accessed dark web site by analyzing the collected web page information comprises, extracting a SHA-256 value from the collected web page information, checking whether the extracted SHA-256 value exists in a database and updating a corresponding document based on a determination that the SHA-256 value exists in the database.

According to an embodiment, wherein providing the analysis result of the accessed dark web site by using the stored information on the accessed dark web site comprises, providing a virtual dark web site corresponding to the collected web page information on a virtual network and analyzing traffic generated in the virtual network.

According to another aspect of the present disclosure, an apparatus for collecting dark web information comprising, an onion address management unit for obtaining a list of onion addresses of a plurality of target dark web sites, a collection unit for accessing at least one of the plurality of target dark web sites and collecting web page information of the accessed dark web site, a storage unit for storing information on the accessed dark web site by analyzing the collected web page information and an information providing unit for providing an analysis result of the accessed dark web site by using the stored information on the accessed dark web site.

According to another aspect of the present disclosure, a computer readable non-transitory storage medium comprising an instruction, wherein the instruction is executable by a processor to cause the processor to perform operations comprising, obtaining a list of onion addresses of a plurality of target dark web sites, accessing at least one of the plurality of target dark web sites, collecting web page information of the accessed dark web site, storing information on the accessed dark web site by analyzing the collected web page information and providing an analysis result of the accessed dark web site by using the stored information on the accessed dark web site.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present inventive concept, when it is determined that the detailed description of the related wellknown configuration or function may obscure the gist of the present inventive concept, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present inventive concept will be described in detail with reference to the accompanying drawings.

Figure 1:
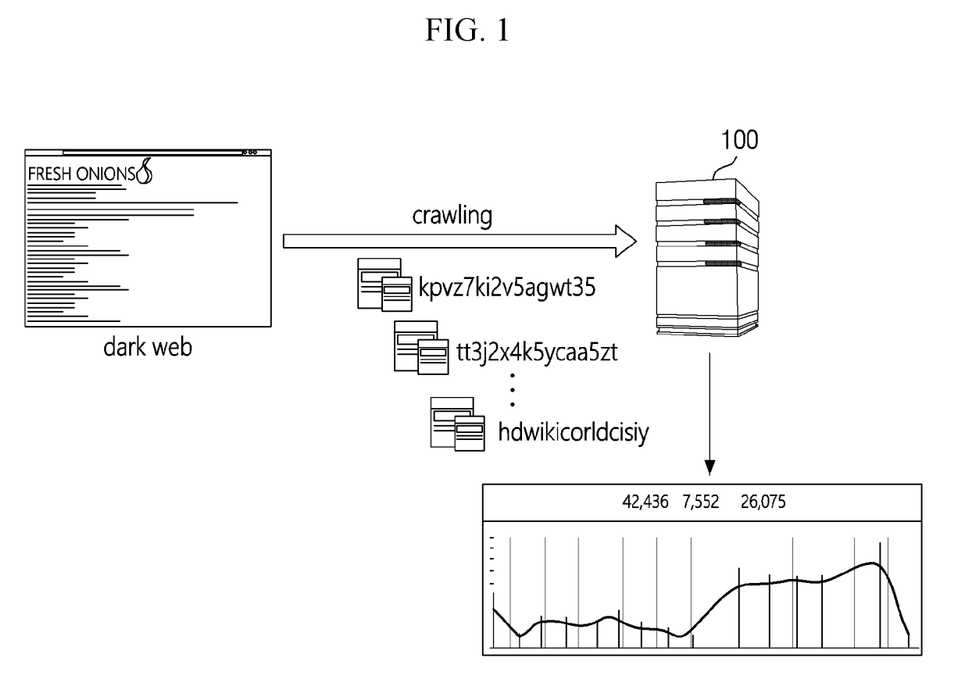
FIG. 1 is a view for describing a dark web information collection apparatus according to an embodiment of the present disclosure.

FIG. 1 is a view for describing a dark web information collection apparatus according to an embodiment of the present disclosure.

Referring to FIG. 1, the apparatus 100 for collecting dark web information according to the present embodiment may access each of a plurality of search target dark web sites and collect web page information of these dark web sites.

The dark web information collection apparatus 100 may collect web page information of the dark web site, analyze information about the dark web, and provide it. The dark web site refers to a web, in which a specific program, such as a Tor browser, should be used to access the Internet, and services provided by the dark web site are referred to as dark web services or hidden services.

The dark web information collection apparatus 100 may obtain an address list of a plurality of search target dark web sites, and access the dark web site using the obtained address list. Because the addresses of many dark web sites end with '.onion,' the addresses of dark web sites are often referred to as 'onion addresses.'

The dark web information collection apparatus 100 may collect web page information of the dark web site by accessing each of a plurality of search target dark web sites. In this case, the dark web information collection apparatus 100 may collect information by crawling on subpages belonging to the domain of the dark web site. In this case, the dark web information collection apparatus 100 may collect web page information in HTML format, but is not limited thereto, and may collect various types of information, in which the dark web is implemented.

The dark web information collection apparatus 100 may store information on the dark web site by analyzing the collected web page information. The dark web information collection apparatus 100 may store and manage information on the dark web site in a database. In this case, the dark web information collection apparatus 100 may store and manage the refined information by pre-processing the corresponding information.

Thereafter, the dark web information collection apparatus 100 may provide an analysis result of the dark web site by using the stored information included in the dark web site. Further, the dark web information collection apparatus 100 may provide a virtual dark web site for dark web pages collected on a network, or provide the collected dark web site information to a separate computing device that provides a virtual dark web site.

Further, the dark web information collection apparatus 100 may measure and analyze traffic generated in the virtual network. The dark web information collection apparatus 100 may provide such information as numerical information or may provide information in a chart format.

The dark web information collection apparatus 100 according to an embodiment of the present disclosure has an advantage of stably collecting dark web page information on a dark web network having low network stability.

The apparatus 100 for collecting dark web information according to an embodiment of the present disclosure has been schematically described above with reference to FIG. 1. Hereinafter, a specific embodiment of a method for collecting dark web information according to another embodiment of the present disclosure will be described with reference to FIGS. 2 to 10. This embodiment may be performed by a computing device. For example, the computing device may be the dark web information collection apparatus 100. In describing the present embodiment, description of a subject performing some operations may be omitted. In this case, the performing subject is the computing device.

Figure 2:
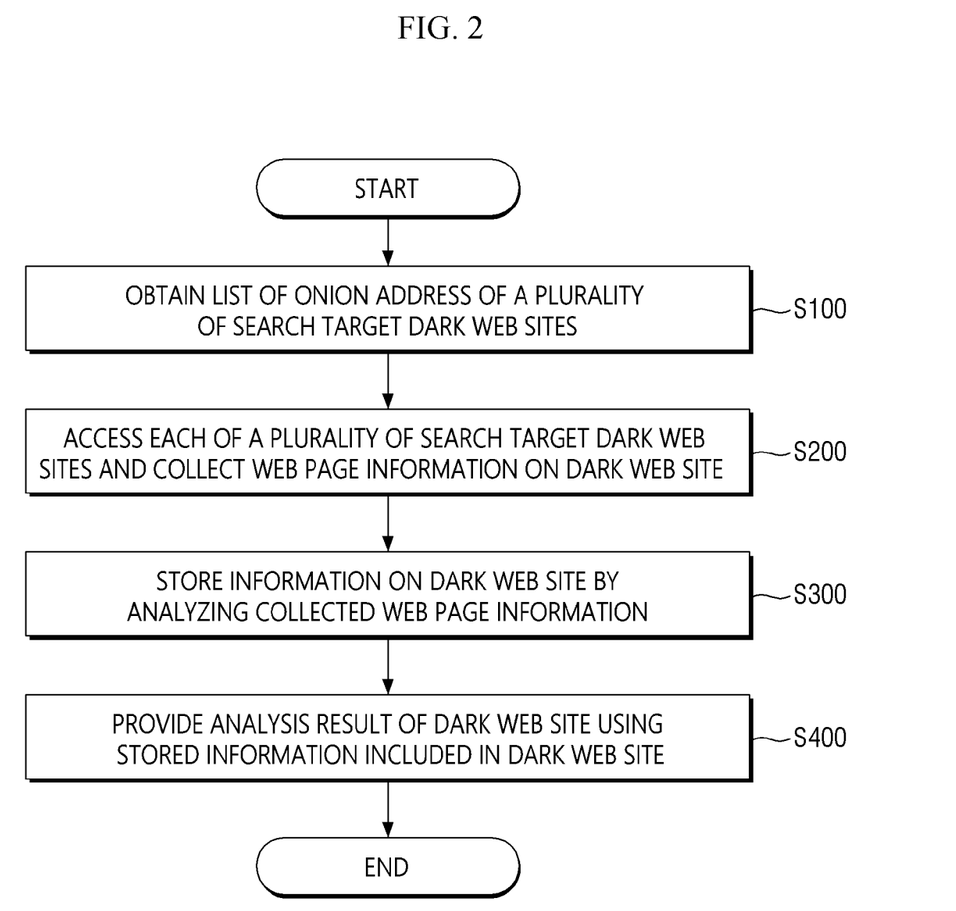
FIG. 2 is a flowchart of a method for collecting dark web information according to another embodiment of the present disclosure.

FIG. 2 is a flowchart of a method for collecting dark web information according to other embodiments of the present disclosure.

Referring to FIG. 2, first, in step S100, a list of onion addresses of a plurality of search target dark web sites may be obtained. The onion address list may be an externally input address list, but does not limit a specific method of obtaining the onion address list. The onion address list obtained in this step is loaded, the onion address list is crawled, and the corresponding dark web site can be accessed.

In step S200, web page information of the dark web site may be collected by accessing each of a plurality of search target dark web sites.

In this step, when web page information of the dark web site is collected, asynchronous crawling may be performed on sub web pages belonging to the domain of the dark web site. Unlike the synchronous method, in this step, crawling may be performed in the asynchronous method of FIG. 3. The synchronous crawling shown on the left side of FIG. 3 performs the first task, processes the first task performed, then performs the next task and processes the next task. In other words, synchronous crawling starts the next task after completing one task. However, since the network is unstable due to the nature of the dark web network that guarantees anonymity, in the case of the above synchronous crawling, there is a disadvantage that it cannot proceed to the next task if the task is not completed after assigning a task, resulting in falling into an infinite loop or not securing 100% data.

Figure 3:
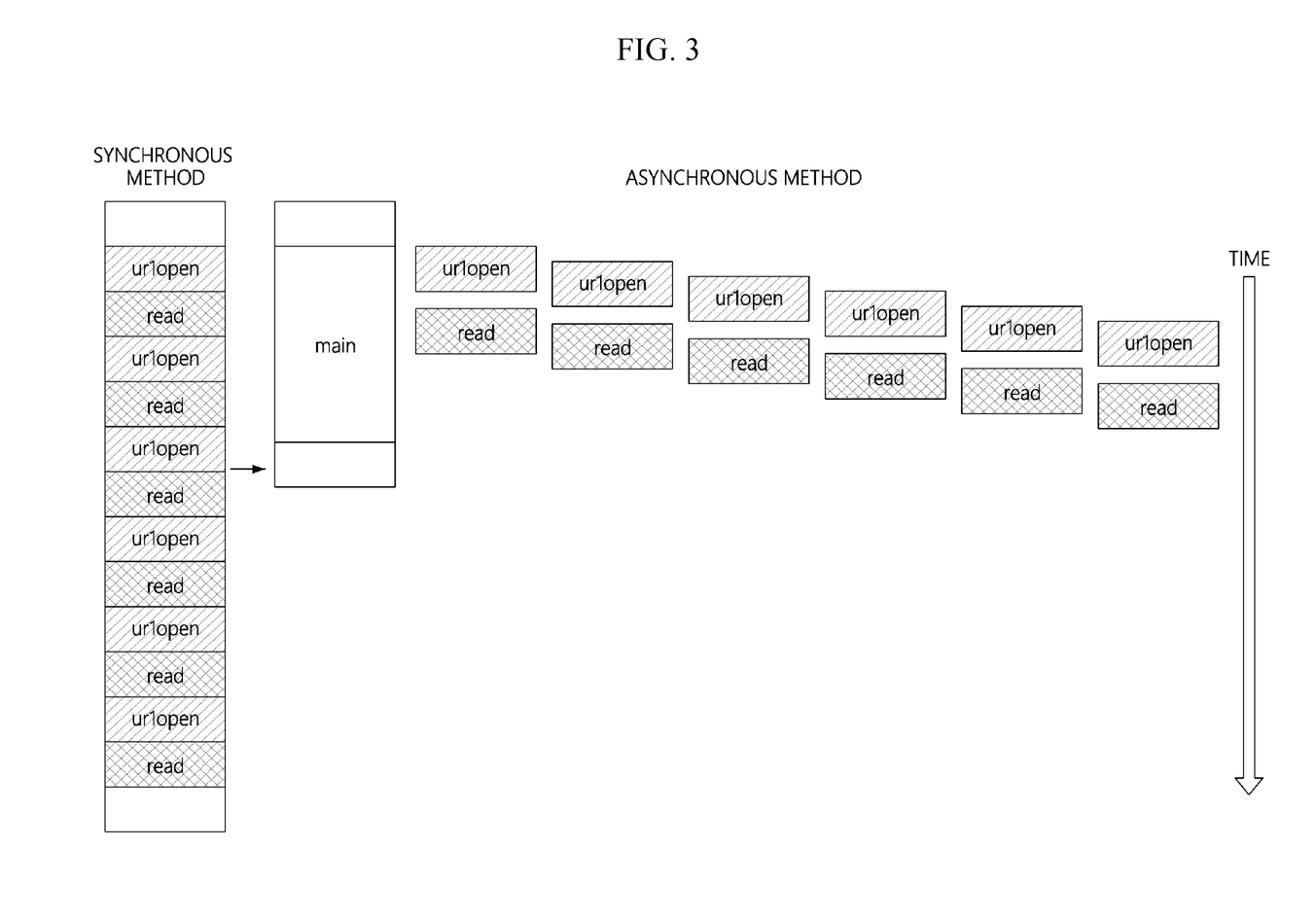
FIG. 3 is a diagram for describing the time required according to the synchronous information collection method and the asynchronous information collection method.

In order to solve the above problem to apply an asynchronous method as shown in the right side of FIG. 3 to collect data in units of individual pages existing on the dark web in this step, data collection efficiency can be increased and system resource consumption can be minimized.

That is, in this step, in order to quickly collect information on an unstable network and prevent a problem of falling into an infinite loop or missing data, asynchronous crawling on web pages may be performed.

Figure 4:
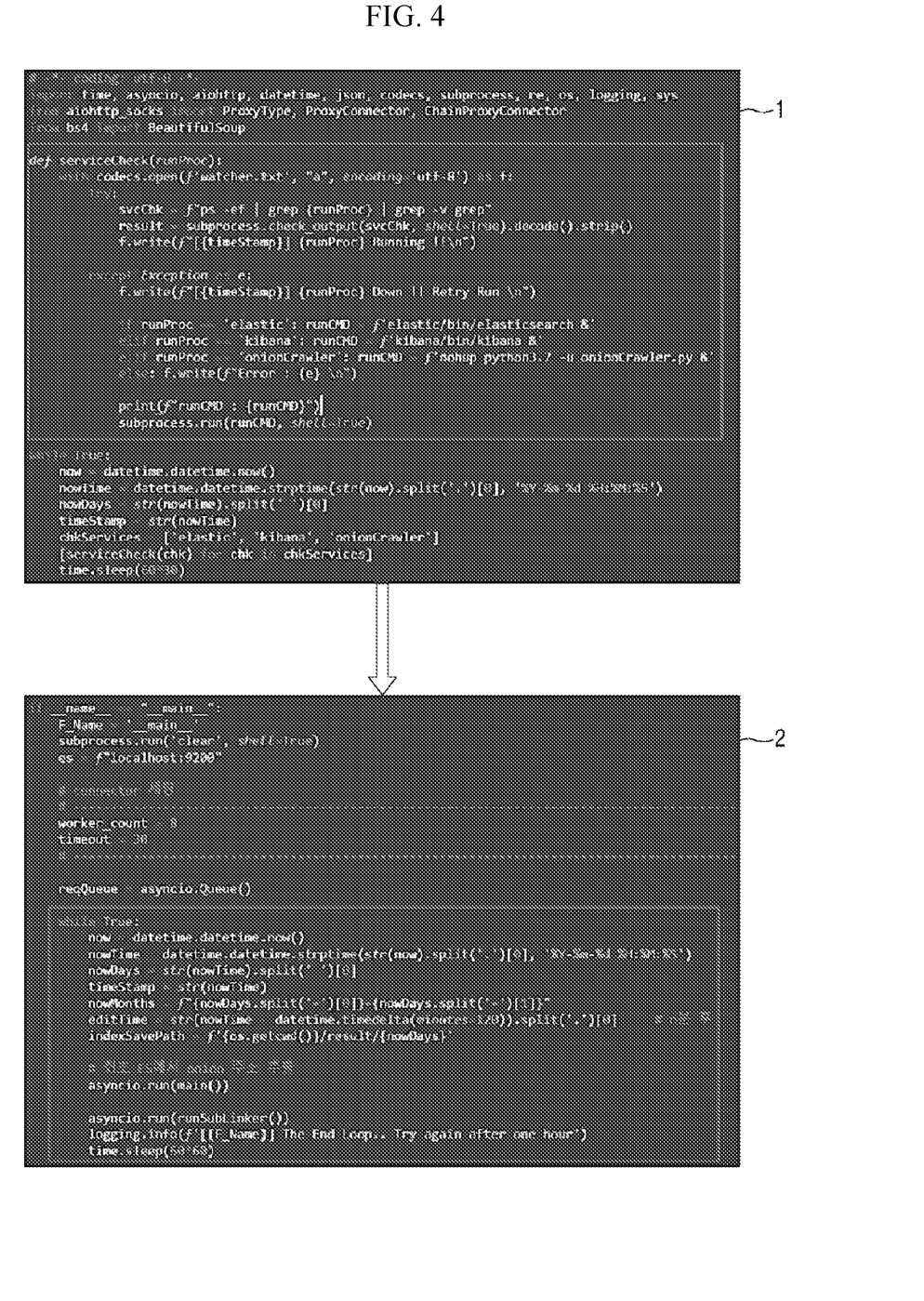
FIG. 4 is a reference diagram illustrating an exemplary program code for collecting dark web information using an asynchronous crawling method according to some embodiments.

FIG. 4 is a diagram for describing an example of collecting dark web information using an asynchronous crawling method according to some embodiments.

While the asynchronous crawling operation is performed in step S200, it may be checked whether the crawling operation is properly performed at predetermined intervals. As an example, the monitoring code 1 may check the execution status of the asynchronous crawling operation at predetermined time intervals, e.g., checking whether the asynchronous crawling operation is being executed normally, and the monitoring code 1 may perform an operation of checking every 30 minutes.

Further, when asynchronous crawling is performed in this step, when the asynchronous crawling operation is completed, the asynchronous crawling operation on the web pages may be re-executed at a predetermined time interval. For example, if all the logic of the asynchronous crawler code 2 is performed in this step, the crawler code 2 may be automatically re-executed after a predetermined interval. In one embodiment, the crawler code 2 may be re-executed every 60 minutes.

Figure 5:
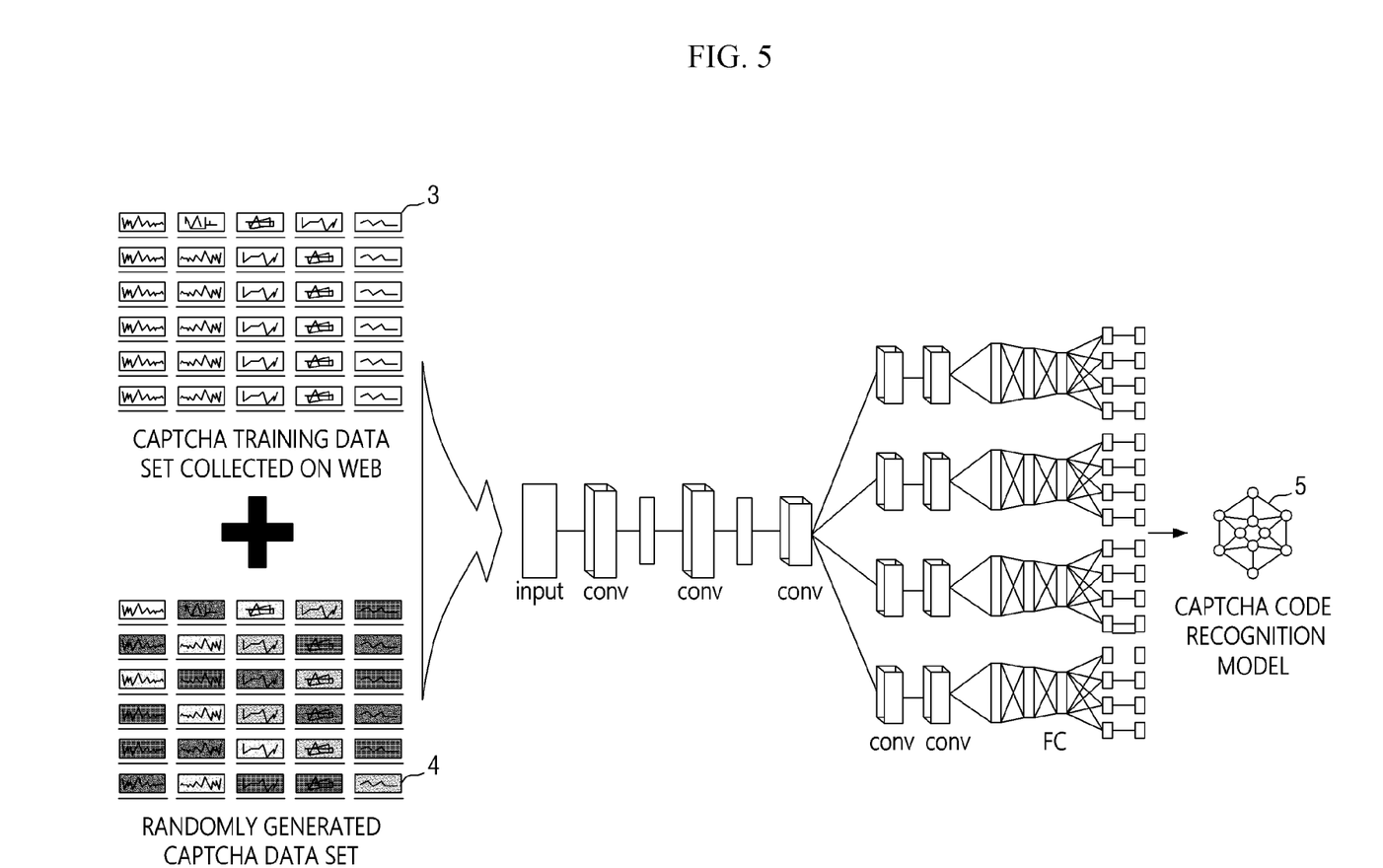
FIG. 5 is a diagram for describing an operation of training a captcha code recognition model according to some embodiments.

FIG. 5 is a diagram for describing an operation of training a captcha code recognition model according to some embodiments.

Referring to FIG. 5, when an operation of accessing a dark web site is performed in step S200, an operation of identifying whether the dark web site requires input of a captcha code and bypassing it may be performed. That is, in this step, an additional authentication procedure for accessing the dark web site may be performed. After the operation of identifying whether the dark web site requires the input of the captcha code is performed, the captcha code of the dark web site may be input by using the captcha code bypass module passing through the captcha code.

Specifically, in step S200, it can be identified whether the dark web site requires the input of the captcha code by using the captcha code bypass module, and if the dark web site requires the input of the captcha code, the token corresponding to the captcha code displayed as an image may be recognized and the token may be automatically input. Such a captcha code bypass module may be composed of a captcha code recognition model built on the basis of an artificial neural network.

The captcha code recognition model may be a model trained using a training data set. The training data set may include a first group of captcha codes collected on the web and a second group of captcha codes which are generated randomly. That is, the captcha code recognition model can build a training data set by properly mixing the captcha code collected on the web and the randomly generated captcha code, and train the model by using it.

The captcha code recognition model may be a model that is trained for each character of the characters included in the image of the capture code using a convolutional neural network.

As a basic CNN layer configuration, when the training data becomes enormous, there may be an issue that a specific layer is not properly trained, so the captcha code recognition model is converted as shown in FIG. 5 to configure a training model for each character.

So far, a specific example of step S200 has been described with reference to FIGS. 3 to 5. Hereinafter, a specific operation of step S300 will be described with reference to FIGS. 6 to 10.

Figure 6:
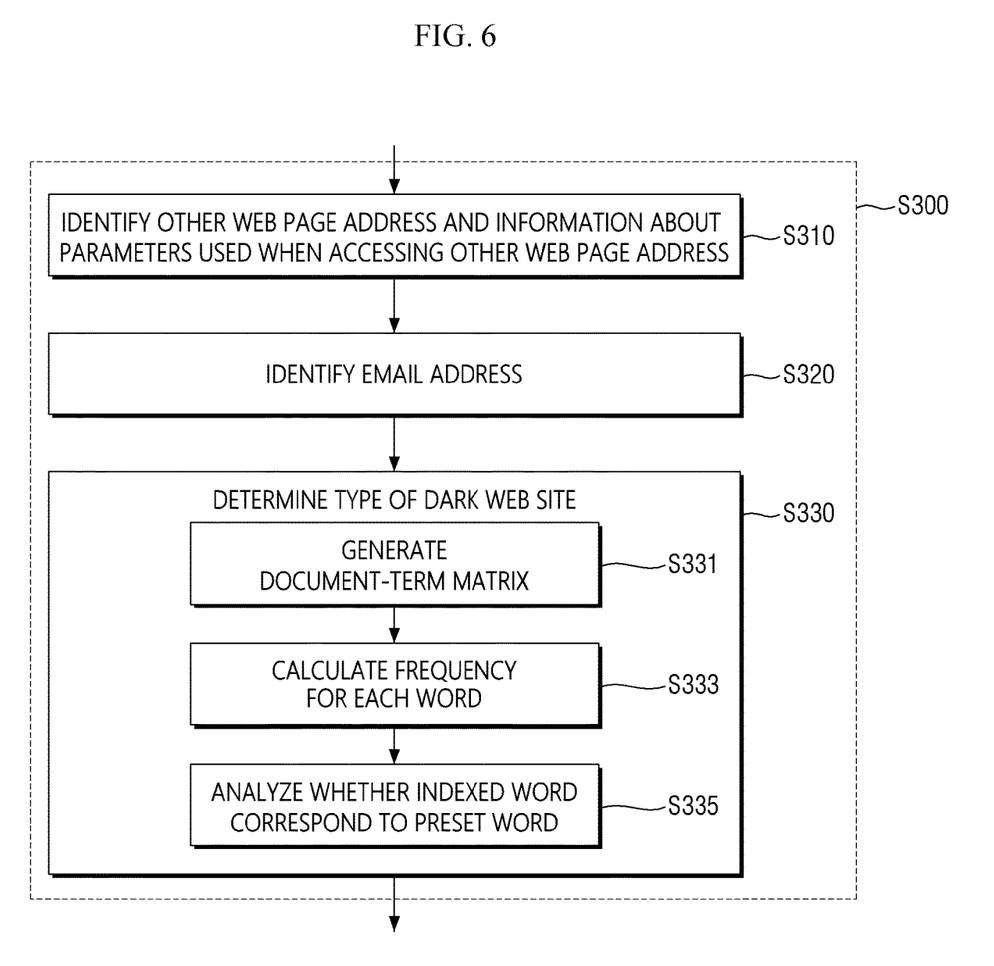
FIG. 6 is a flowchart for describing step S300 of FIG. 2 in more detail.
Figure 7:
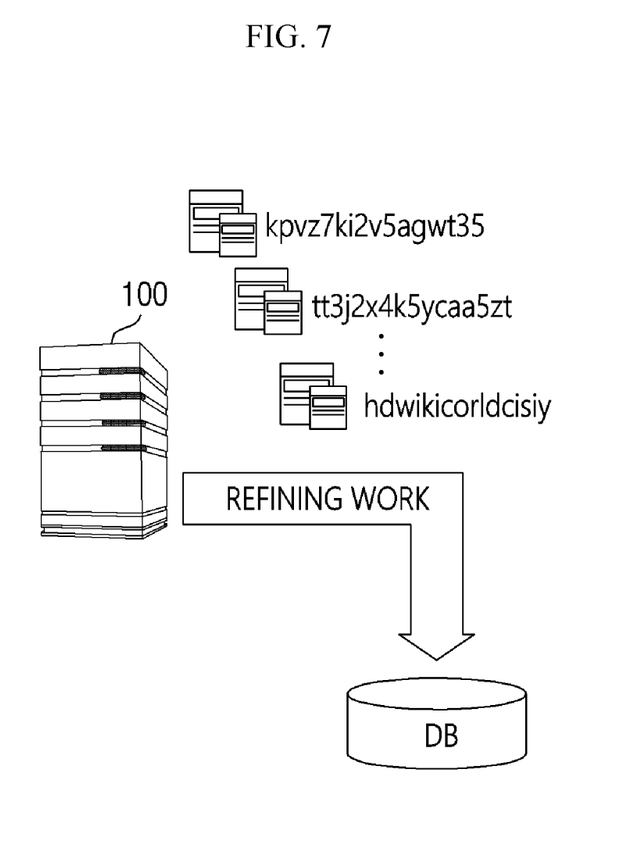
FIG. 7 is a diagram illustrating an example of information on a dark web site stored in a database.

FIG. 6 is a flow chart for describing step S300 of FIG. 2 in more detail, and FIG. 7 is a diagram illustrating an example of information on a dark web site stored in a database.

As shown in FIG. 6, when information on a dark web site is stored in step S300, steps S310 to S330 may be performed.

Specifically, from the web document corresponding to the web page collected in step S310, other web page address and information about a parameter used when accessing the other web page address may be identified. At this time, a value corresponding to meta information (time, hash, characteristic information, parameter, etc.) of the data collected by the crawler may be defined. Further, an email address may be identified from a web document corresponding to the web page in step S320.

For example, as shown in FIG. 7, in this step, the collected data may be refined to meet the purpose. For example, after various data refining operations are performed such as a tag value of HTML is extracted, parameter values are extracted with the keywords of "?," "&," "javascript," or the keywords of "bitcoin," "mail" are extracted by the dark web information collection apparatus 100, they may be stored in the database.

Figure 8:
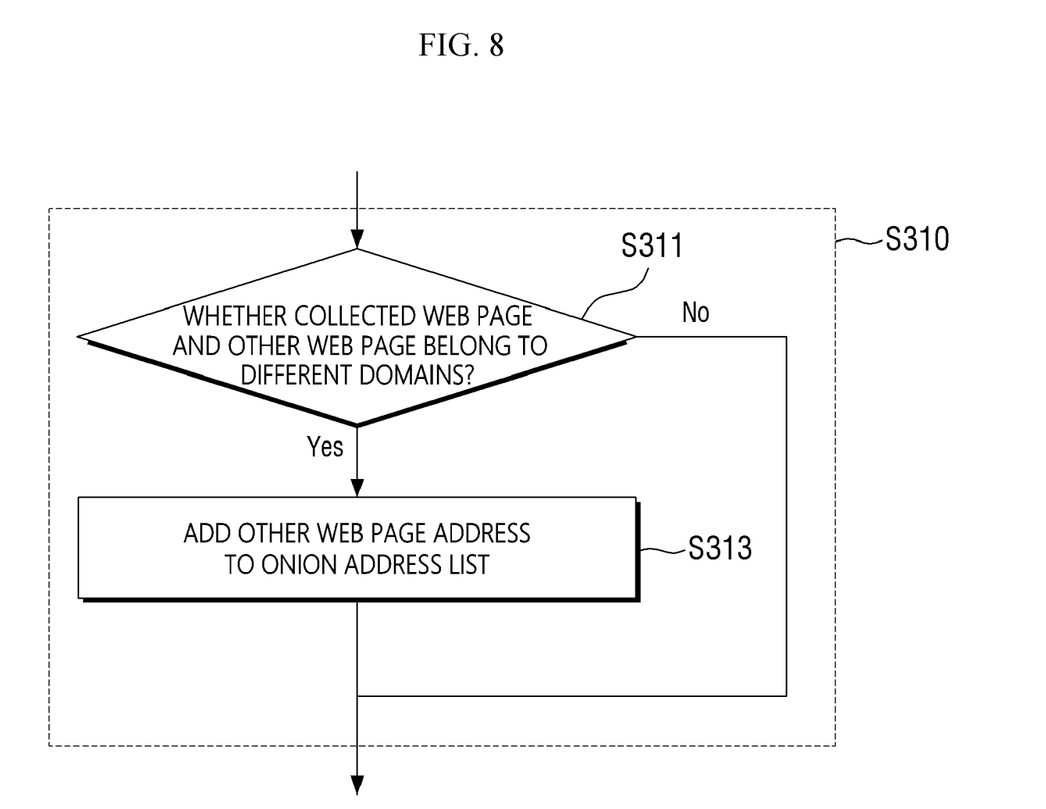
FIG. 8 is a flowchart for describing step S310 of FIG. 6 in more detail.

FIG. 8 is a flowchart for describing step S310 of FIG. 6 in more detail. In step S311 of FIG. 8, it may be checked whether other domains exist with the keyword of "http," and based on the determination that the collected webpage and the other webpage belong to different domains, step S313 is performed. As a result, the address of the other web page may be added to the onion address list of a plurality of search target dark web sites.

Thereafter, the type of the dark web site may be determined based on words included in the web document corresponding to the web page collected in step S330. In this case, steps S331 to S335 of FIG. 6 may be performed.

In step S331, a document-term matrix is generated, a frequency for each word is calculated from the document-term matrix generated in step S333, and an index is assigned to a word corresponding to a frequency equal to or higher than the preset frequency in step S335. In addition, the type of the dark web site may be classified by analyzing whether or not the indexed words correspond to preset words. Detailed information about this will be described with reference to FIG. 9.

Figure 9:
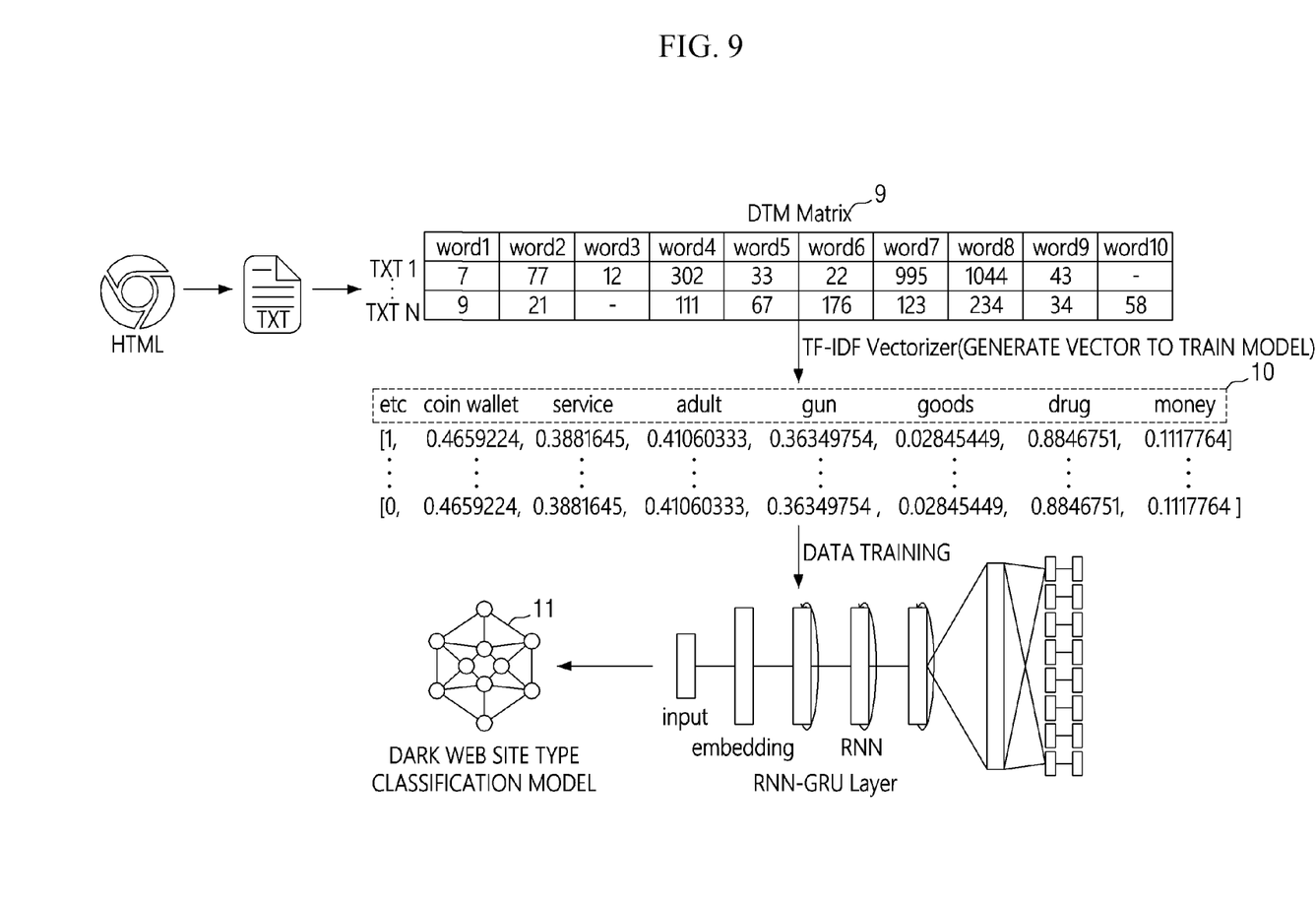
FIG. 9 is a diagram for describing an operation of training a dark web site type classification model according to some embodiments.

FIG. 9 is a diagram for describing an operation of training a dark web site type classification model according to some embodiments.

Referring to FIG. 9, collected web document files are converted into plain texts, and a document-term matrix 9 for the texts may be generated.

After that, the frequency for each word is calculated from the generated document-term matrix, and an index 10 may be assigned to words corresponding to frequencies equal to or greater than the preset frequency that are "coin wallet," "service," "adult," "gun," "goods," "drug," and "money." In other words, in this step, TF-IDF values for the top N % words per TXT file are calculated for words corresponding to eight categories (adult, drug, goods, gun, money, service, coin_wallet, etc.) and index 10 may be assigned.

Words, to which the index 10 is assigned, are converted into vectors, and the type of the dark web site may be classified by analyzing whether the vector value corresponds to a preset word. Here, the preset word is a word that refers to the criteria for classifying the types of dark web sites, and is a word that can be changed or updated according to the user's setting.

In this step, the types of dark web sites may be classified using the dark web site type classification model. In the dark web site type classification model, training may be performed using a vector value as an input value and a dark web site classification type as an output value. As an example, the dark web site type classification model may be a model trained in the RNN-GRU layer based on the TF-IDF vector value.

Figure 10:
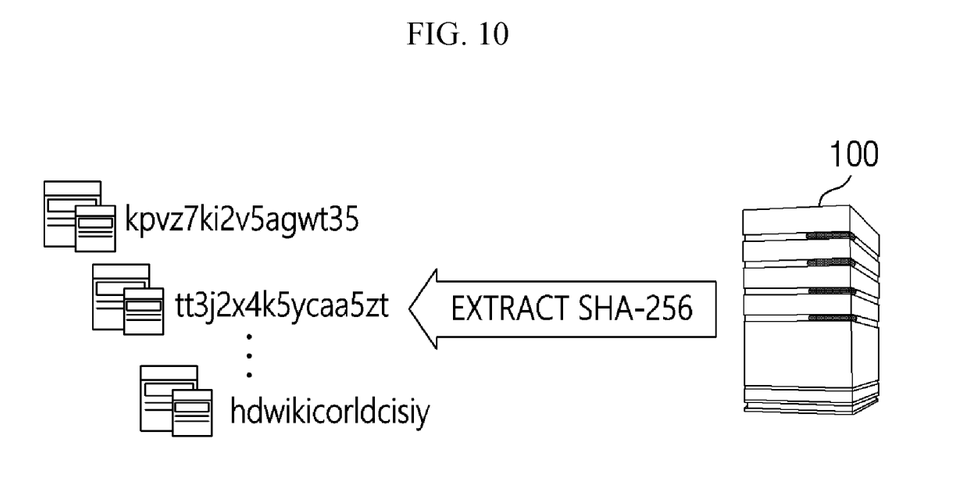
FIG. 10 is a reference diagram showing an exemplary program code for extracting a SHA-256 value from information collected about the dark web.

FIG. 10 is a diagram for describing an operation of extracting a SHA-256 value from information collected about the dark web.

When the operation of storing the information on the dark web site by analyzing the web page information collected in step S300 is performed, in order to ensure the up-to-date of the data, the content HASH may be compared after checking the operating status by periodically accessing each link. In the case of the hidden service of the dark web site, since the service is provided very flexibly, the address and content may change frequently.

Accordingly, in order to ensure the up-to-date of data when this step is performed, the content HASH may be compared after checking the operating status by periodically accessing each link. Specifically, when the SHA-256 value is extracted from the HTML data collected by the dark web information collection apparatus 100, and the corresponding SHA-256 value is queried in elasticsearch, and then it is confirmed that the corresponding SHA-256 value exists in the document according to the search result, the time value of the document may be updated. If the corresponding SHA-256 value does not exist in the document, a new document may be created.

The method for collecting dark web information according to an embodiment of the present disclosure may increase data collection efficiency and minimize system resource consumption as dark web information is collected using various operations described above.

Further, the dark web information collection method according to the present embodiment refines the collected information in various ways and provides a virtual dark web site for the collected web page on a virtual network, thereby having an advantage of providing a high-performance test bed.

In one embodiment, the present disclosure may be implemented with a computer readable non-transitory storage medium comprising instructions for performing the above-described methods.

Figure 11:
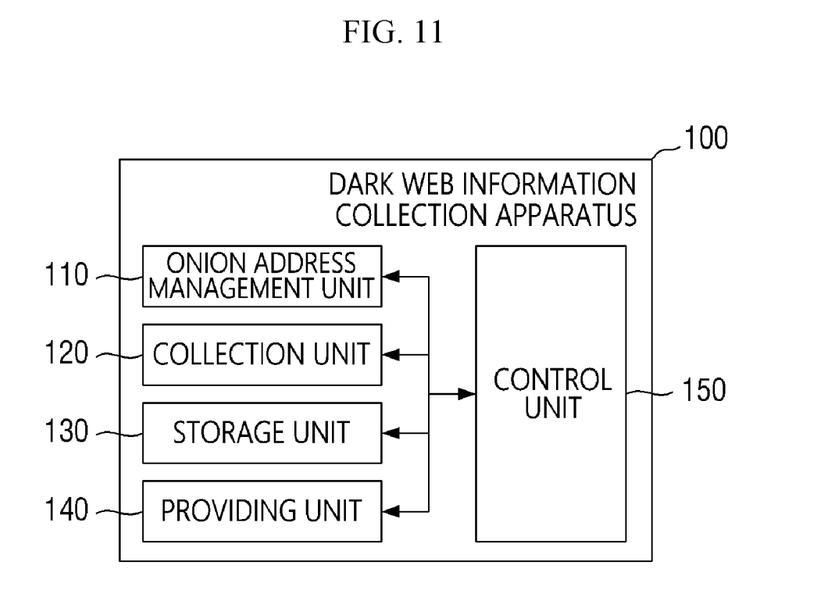
FIG. 11 is a block diagram illustrating a function and configuration of an apparatus for collecting dark web information according to some embodiments of the present disclosure.

A detailed operation of the method for collecting dark web information according to an embodiment of the present disclosure has been described with reference to FIGS. 1 to 10 so far. Hereinafter, a detailed configuration and function of a dark web information collection apparatus that performs an operation of the dark web information collection method will be described. FIG. 11 is a block diagram illustrating a function and configuration of the dark web information collecting apparatus 100 according to some embodiments of the present disclosure.

The dark web information collection apparatus 100 according to the present embodiment may comprises an onion address management unit 110, a collection unit 120, a storage unit 130, a providing unit 140, and a control unit 150. The apparatus 100 for collecting dark web information according to the present embodiment may be a subject that performs the operation of the above-described method for collecting dark web information.

The onion address management unit 110 may obtain a list of onion addresses of a plurality of search target dark web sites. The onion address management unit 110 may store addresses of dark web sites and update existing addresses when the dark web site address is changed to a new address.

The collection unit 120 may collect web page information of the dark web site by accessing each of the plurality of search target dark web sites. When collecting web page information of the dark web site, the collection unit 120 may perform asynchronous crawling on sub web pages belonging to the domain of the dark web site.

The collection unit 120 may use the captcha code bypass module to identify whether the dark web site requests the input of the captcha code, and when the dark web site requires the input of the captcha code, the token corresponding to the captcha code displayed as an image is recognized and the token may be automatically input. Such a captcha code bypass module may be composed of a captcha code recognition model built on the basis of an artificial neural network.

The captcha code recognition model may be a model trained using a training data set. The training data set may include a captcha code collected on the web and a randomly generated captcha code. The captcha code recognition model may be a model that is trained for each character of characters included in the image of the captcha code using a convolutional neural network.

The storage unit 130 may store information on a dark web site by analyzing web page information collected by the collection unit 120. The providing unit 140 may provide information on a dark web site.

The control unit 150 may control the dark web information collection apparatus 100 to perform asynchronous crawling on the dark web site by using the onion address list managed by the onion address management unit 110.

Figure 12:
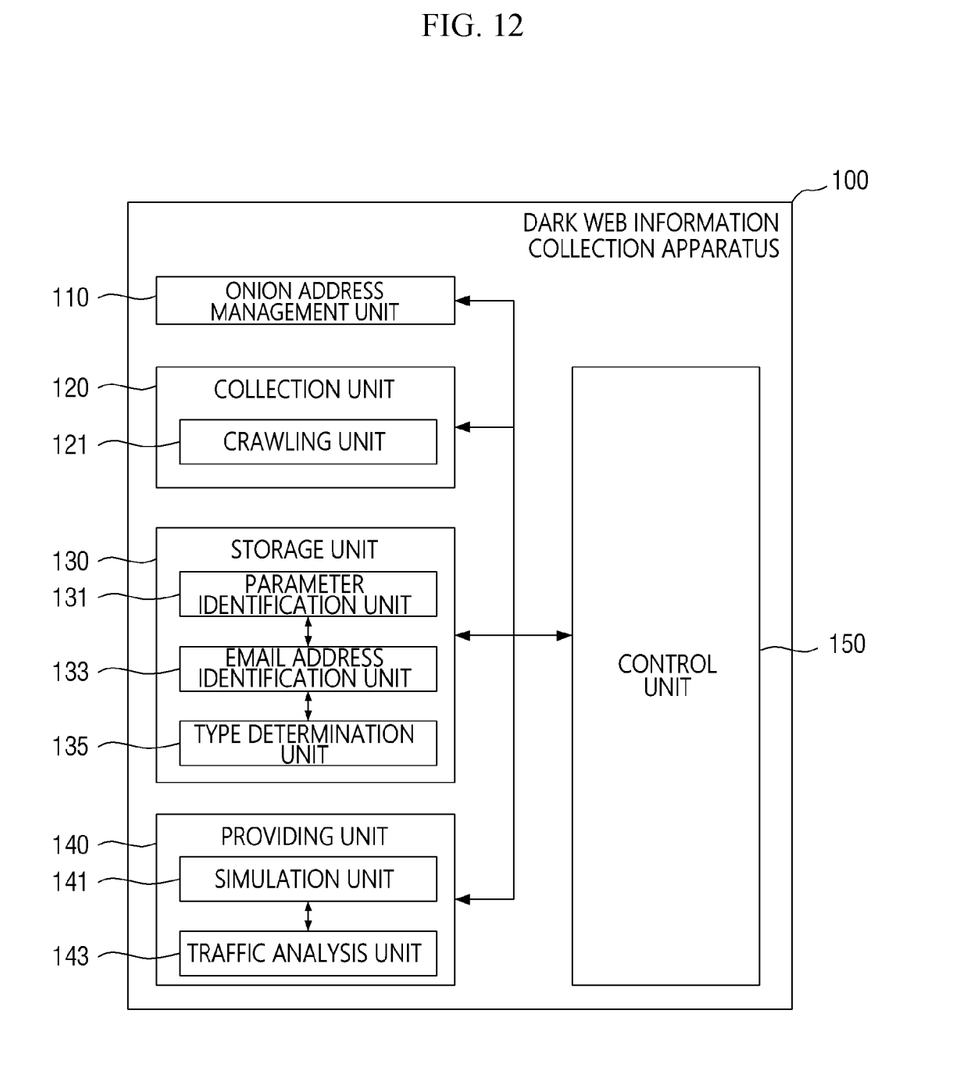
FIG. 12 is a block diagram for describing in more detail some of the configurations included in FIG. 11.

FIG. 12 is a block diagram for describing in more detail some of the configurations included in FIG. 11.

The collection unit 120 may include a crawling unit 121 for asynchronously crawling on web pages of a dark web site. The crawling unit 121 may asynchronously crawl on web pages in order to quickly collect information on an unstable dark web network and prevent a problem of falling into an infinite loop or missing data. While the asynchronous crawling operation is being performed, the crawling unit 121 may check the crawling code on whether the operation is properly performed at predetermined intervals. Further, when asynchronous crawling is performed, the crawling unit 121 may re-execute the asynchronous crawling operation on web pages at predetermined time intervals when the asynchronous crawling operation is completed.

The storage unit 130 may include a parameter identification unit 131, an email address identification unit 133, and a type determination unit 135.

The parameter identification unit 131 may identify other web page address and information on a parameter used when accessing the other web page address from a web document corresponding to the collected web page.

The parameter identification unit 131 may extract a tag value of HTML from a web document corresponding to a web page, or extract a parameter value using '?,' "&," and "javascript" as keywords. The email address identification unit 133 may identify an email address by extracting a keyword of "mail" from a web document corresponding to a web page. The type determination unit 135 may determine the type of the dark web site based on words included in a web document corresponding to the collected web page.

The type determination unit 135 may classify the type of dark web site using the dark web site type classification model. In the dark web site type classification model, a vector value is used as an input value and a dark web site classification type is used as an output value to perform the training. As an example, the dark web site type classification model may be a model trained in the RNN-GRU layer based on the TF-IDF vector value.

The providing unit 140 may include a simulation unit 141 and a traffic analysis unit 143.

The simulation unit 141 may provide the dark web site on a virtual network by using information on the dark web site. The traffic analysis unit 143 may analyze traffic generated by the virtual dark web site provided by the simulation unit 141.

Although the embodiments have been described with reference to the accompanying drawings above, those of ordinary skill in the art to which the present disclosure pertains can understand that the present disclosure can be implemented in other specific forms without changing the technical spirit or essential features. Therefore, it should be understood that the embodiments described above are illustrative in all respects and not limiting.

What is claimed is:

1. A method for collecting dark web information performed by a computing device comprising:
    obtaining a list of onion addresses of a plurality of target dark web sites;
    accessing at least one of the plurality of target dark web sites;
    collecting web page information of the accessed dark web site;
    storing information on the accessed dark web site by analyzing the collected web page information; and
    providing an analysis result of the accessed dark web site by using the stored information on the accessed dark web site,
    wherein accessing at least one of the plurality of target dark web sites comprises,
    identifying whether the accessed dark web site requires input of a captcha code; and
    inputting the captcha code of the accessed dark web site using a captcha code bypass module.

2. The method of claim 1, wherein collecting web page information of the accessed dark web site comprises asynchronously crawling on web pages belonging to a domain of the accessed dark web site.

3. The method of claim 2, wherein asynchronously crawling on web pages belonging to the domain of the accessed dark web site comprises re-executing the asynchronous crawling on the web pages after a predetermined time interval when the asynchronously crawling is completed.

4. The method of claim 2, wherein asynchronously crawling on web pages belonging to the domain of the accessed dark web site comprises checking an execution status of the asynchronous crawling at predetermined time intervals.

5. The method of claim 1, wherein the captcha code bypass module includes a captcha code recognition model based on an artificial neural network.

6. The method of claim 5, wherein the captcha code recognition model is a model trained using a training data set,
    wherein the training data set includes a first group of captcha codes which are collected on a web and a second group of captcha codes which are randomly generated.

7. The method of claim 5, wherein the captcha code recognition model is a model based on a convolutional neural network and trained with each character of characters within a plurality of images of a training data set.

8. The method of claim 1, wherein storing information on the accessed dark web site by analyzing the collected web page information comprises,
    identifying other web page address and information on a parameter used when accessing the other web page address from a web document corresponding to the collected web page information;
    identifying an email address from the web document corresponding to the collected web page information; and
    determining a type of the accessed dark web site based on words included in the web document corresponding to the collected web page information.

9. The method of claim 8, wherein determining a type of the accessed dark web site based on words included in the web document corresponding to the collected web page information comprises,
    converting the collected web page information into plain texts;
    generating a document-term matrix using the plain texts;
    calculating a frequency for each word based on the generated document-term matrix; and
    classifying a type of the accessed dark web site by assigning an index to a word corresponding to a frequency equal to or greater than a preset frequency and analyzing whether the indexed words correspond to a preset word.

10. The method of claim 8, wherein identifying the other web page address and information on the parameter used when accessing the other web page address comprises,
    adding the other web page address to the list of onion addresses of the plurality of target dark web sites, based on a determination that a web page corresponding to the collected web page information and the other web page belong to different domains.

11. The method of claim 1, wherein storing information on the accessed dark web site by analyzing the collected web page information comprises,
    extracting a SHA-256 value from the collected web page information;
    checking whether the extracted SHA-256 value exists in a database; and
    updating a corresponding document based on a determination that the SHA-256 value exists in the database.

12. The method of claim 1, wherein providing the analysis result of the accessed dark web site by using the stored information on the accessed dark web site comprises,
    providing a virtual dark web site corresponding to the collected web page information on a virtual network; and
    analyzing traffic generated in the virtual network.

13. An apparatus for collecting dark web information comprising:
    an onion address management unit for obtaining a list of onion addresses of a plurality of target dark web sites;
    a collection unit for accessing at least one of the plurality of target dark web sites and collecting web page information of the accessed dark web site;
    a storage unit for storing information on the accessed dark web site by analyzing the collected web page information; and
    an information providing unit for providing an analysis result of the accessed dark web site by using the stored information on the accessed dark web site,
    wherein the collection unit comprises, a captcha code identification unit for identifying whether the accessed dark web site requires input of a captcha code; and a captcha code bypass unit for inputting the captcha code of the accessed dark web site using a captcha code bypass module.

14. The apparatus of claim 13, wherein the collection unit includes a crawling unit for asynchronously crawling on web pages belonging to a domain of the accessed dark web site.

15. The apparatus of claim 13, wherein the captcha code bypass module includes a captcha code recognition model based on an artificial neural network.

16. The apparatus of claim 13, wherein the storage unit comprises, a parameter identification unit for identifying other web page address and information on a parameter used when accessing the other web page address from a web document corresponding to the collected web page information;

an email address identification unit for identifying an email address from the web document corresponding to the collected web page information; and a type determination unit for determining a type of the accessed dark web site based on words included in the web document corresponding to the collected web page information.

17. The apparatus of claim 13, wherein the information providing unit further comprises, a simulation unit for providing a virtual dark web site corresponding to the collected web page information on a virtual network; and a traffic analysis unit for analyzing traffic generated in the virtual network.

18. A computer readable non-transitory storage medium comprising an instruction, wherein the instruction is executable by a processor to cause the processor to perform operations comprising, obtaining a list of onion addresses of a plurality of target dark web sites;

accessing at least one of the plurality of target dark web sites;

collecting web page information of the accessed dark web site;

storing information on the accessed dark web site by analyzing the collected web page information; and providing an analysis result of the accessed dark web site by using the stored information on the accessed dark web site, wherein accessing at least one of the plurality of target dark web sites comprises, identifying whether the accessed dark web site requires input of a captcha code; and inputting the captcha code of the accessed dark web site using a captcha code bypass module.

\* \* \* \* \*